United States Patent [19]

Kajiwara

[11] Patent Number: 5,023,712

[45] Date of Patent: Jun. 11, 1991

[54] TRACKING DISTANCE-MEASURING EQUIPMENT SYSTEM WITH MEANS FOR SETTING A WINDOW AND MEANS FOR SAMPLING IMAGE SIGNALS AT PREDETERMINED TIME INTERVALS

[75] Inventor: Yasuya Kajiwara, Hyogo, Japan

[73] Assignee: Mitsubishi Denki K.K., Tokyo, Japan

[21] Appl. No.: 489,139

[22] Filed: Mar. 6, 1990

[30] Foreign Application Priority Data

Mar. 7, 1989 [JP] Japan ................................. 1-54320
Mar. 7, 1989 [JP] Japan ................................. 1-54321

[51] Int. Cl.$^5$ .............................................. H04N 7/18
[52] U.S. Cl. ..................................... 358/105; 358/126
[58] Field of Search ............... 358/103, 88, 107, 126, 358/105, 125; 364/516, 517

[56] References Cited

U.S. PATENT DOCUMENTS 4,220,967 9/1980 Ichida et al. ..................... 358/105
4,695,156 9/1987 Taft ................................. 358/107 X

FOREIGN PATENT DOCUMENTS 60-33352 8/1985 Japan .
60-48952 10/1985 Japan .
63-46363 9/1988 Japan .

Primary Examiner—Kenneth A. Wieder
Assistant Examiner—Glenn W. Brown
Attorney, Agent, or Firm—Sughrue, Mion, Zinn, Macpeak & Seas

[57] ABSTRACT

A tracking distance-measuring equipment for measuring the distance from a moving target on the principle of triangulation by electrically detecting the respective dislocations of first and second images focused on the image sensors of paired first and second optical systems disposed side by side from the optical axis through the comparison of image signals provided by the image sensors respectively representing the first and second images. A window is set in a specific portion of either the first or second image signal, image signals provided by the image sensors are sampled periodically at predetermined intervals. The sample image signals provided by one of the image sensors are compared with the window set in an image equivalent to the sample image signal provided by the other image sensor at a sampling point. The tracking distance-measuring equipment is capable of continuously measuring the distance from the moving target and determining the direction and distance of movement of the target.

3 Claims, 4 Drawing Sheets

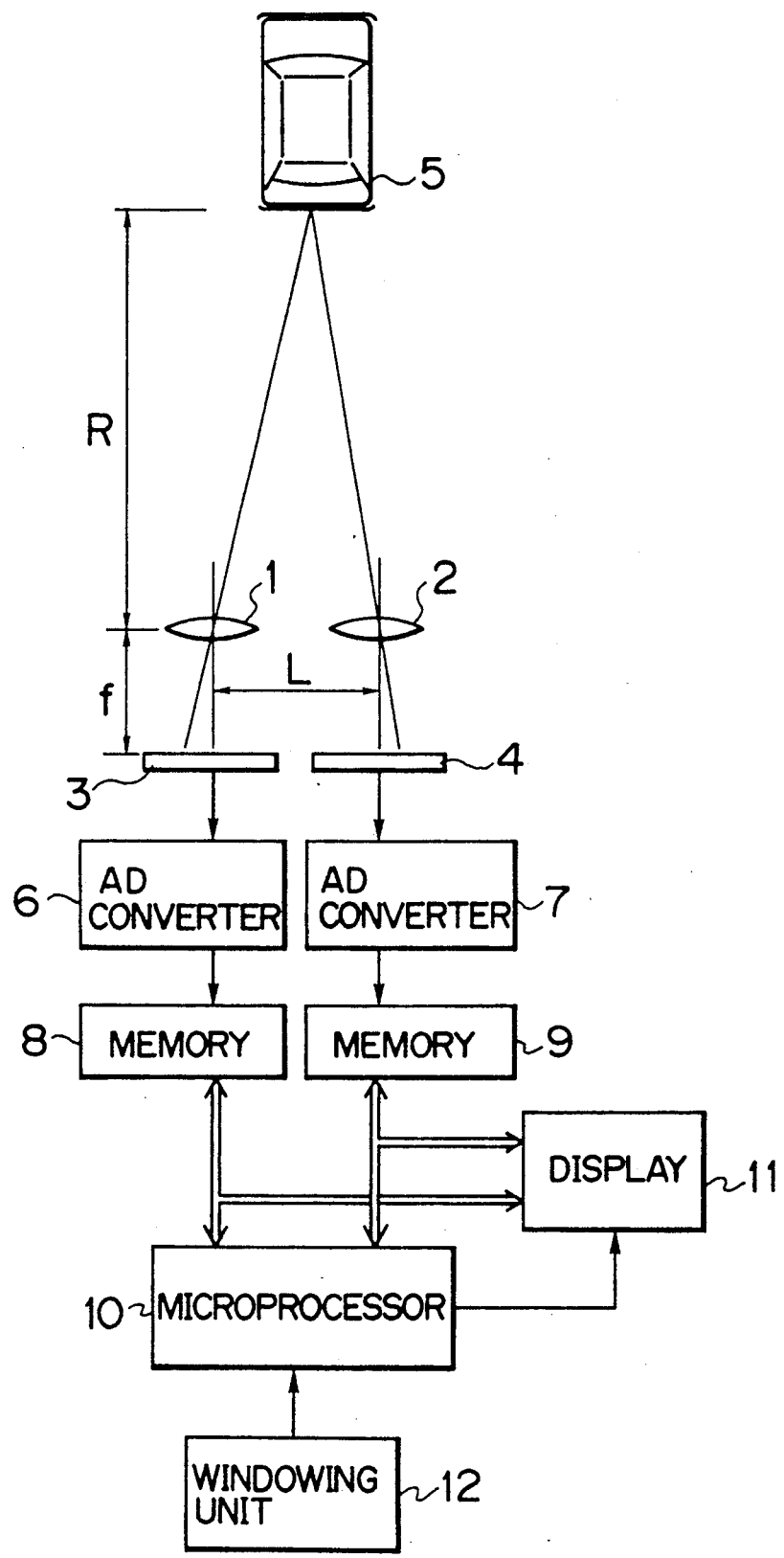

TRACKING DISTANCE-MEASURING EQUIPMENT SYSTEM WITH MEANS FOR SETTING A WINDOW AND MEANS FOR SAMPLING IMAGE SIGNALS AT PREDETERMINED TIME INTERVALS

BACKGROUND OF THE INVENTION

1. Field of the Invention

The present invention relates to a tracking distance-measuring system for continuously measuring distance to, and the distance and direction of movement of, a moving target such as a running automobile.

2. Description of the Prior Art

FIG. 5 shows a distance-measuring system disclosed in Japanese Patent Publication No. 63-46363. Referring to FIG. 5, the distance-measuring system has a right optical system and a left optical system respectively comprising lenses 1 and 2 disposed a distance L apart, which corresponds to the length of a base line between the respective optical axes thereof, and image sensors 3 and 4 disposed at a distance f apart, corresponding to the focal lengths of the lenses 1 and 2 on the optical axes respectively. The image of a target 5 at a distance R from a plane including the lenses 1 and 2 are focused on the image sensors 3 and 4 respectively by the lenses 1 and 2. Then, the image sensors generate image signals. AD converters (analog-to-digital converters) 6 and 7 convert the analog image signals into proportional digital image signals, and memories 8 and 9 store the digital image signals respectively. A microprocessor 10 processes the digital image signals stored in the memories 8 and 9 to determine the distance from the target 5.

In operation, the microprocessor 10 reads a picture element signal representing a picture element at the upper left-hand corner of the image sensor 3 from the memory 8, reads a picture element signal representing a picture element signal at the upper left-hand corner of the image sensor 4 from the memory 9, and then calculates the absolute value of the difference between these two picture element signals. Then the microprocessor 10 reads picture element signals respectively representing picture elements respectively nearest to and on the right-hand side of the picture elements respectively at the respective upper left-hand corners of the image sensors 3 and 4, calculates the absolute value of the difference between the picture element signals, and then adds the absolute value to the absolute value obtained in the preceding cycle of calculation. This procedure is repeated sequentially for all the picture elements of the image sensors 3 and 4 to obtain a first value. Subsequently, the microprocessor 10 reads the picture element signal representing the picture element at the upper left-hand corner of the image sensor 3 from the memory 8, reads a picture element signal representing a picture element next to the picture element at the upper left-hand corner of the image sensor 4 to the right, and then calculates the absolute value of the difference between these picture element signals. This procedure is repeated sequentially for the differences between the picture element signal representing the foregoing picture element of the image sensor 3 and the picture element signals representing the rest of the picture elements of the image sensor 4 to obtain a second value, i.e., the accumulated total of the absolute values of the differences.

The relative dislocation of the right and left images is represented by the minimum of the accumulated total. The distance from the target 5 is determined by a formula:

$$R = f \cdot L / n \cdot p$$

where R is the distance from the target 5, n is the number of picture elements corresponding to the relative dislocation, p is the pitch of the picture elements, f is the focal length of the lenses 1 and 2, and L is the distance between the optical axes of the lenses 1 and 2 corresponding to the length of the base line.

This conventional distance-measuring system is able to measure only the distance from only a target on its optical axis. Accordingly, in measuring the distance from a moving object, the distance-measuring system must be turned according to the movement of the moving target so that its optical axis coincide with the target.

SUMMARY OF THE INVENTION

Accordingly, it is an object of the present invention to provide a tracking distance-measuring system capable of continuously measuring the varying distance to a moving target and determining the direction of the target as long as the target is within its field of vision.

To achieve the object, the present invention provides equipment for measuring the distance to a moving target on the principle of triangulation. The respective dislocations of first and second images are focused on two image sensors by first and second juxtapositionally disposed optical systems to produce image signals. The corresponding image signals provided by the two image sensors are then digitized, compared, and processed as will be described.

The tracking distance-measuring system according to the first embodiment includes a; means for setting a window in a specific portion of either the first or second image signal, means for determining the distance to a target by comparing the first and second image signals on the basis of an image signal in the window, and means for sampling the image signals periodically at predetermined time intervals. Subsequent to sampling the image signal within the window set at a sampling point is compared with an image signal sampled at the next sampling point in order to set a new window in a portion of the image signals best coinciding with each other. Thus the direction and distance of movement of a target can be determined.

The tracking distance-measuring system according to a second embodiment of the invention also includes means for sampling comparing, and setting a window to determine the distance to a target. However, the image signal within the window set at a sampling point is compared with a specific portion of a sample image signal sampled at the next sampling point corresponding to the moving velocity of the target. Then a new window is set in a portion of the image signal best coinciding with the previous window, thus determining the direction and distance of movement of the target from the variation. Furthermore, this entails specifying a region for comparing a reference image signal in the window and the other image signal on the basis of the distance determined at the preceding sampling point.

The tracking distance-measuring system of the present invention employs two-dimensional image sensors for detecting images focused by the first and second optical systems, and has a window function to specify a specific image. Image signals provided by the first and second optical systems are compared on the basis of a specified image signal, and the distance to a target is calculated on the principle of triangulation from the respective dislocations of the images focused by the first and second optical systems at a point when the image signals coincide best with each other. The image signals are periodically sampled at predetermined time intervals, and comparison of the image signals at a given sampling point with image signals at the next sampling point determines the direction and distance of movement of the target, and also updates source data for the next distance calculating cycle. Thus, the distance to a moving target and, more importantly, the direction and distance of movement of the target can be determined without moving the tracking distance-measuring system. Further by use of the second embodiment thereof, since an image signal region is specified according to the moving velocity of the target, the processing time can be greatly reduced.

BRIEF DESCRIPTION OF THE DRAWINGS

The above and other objects, features and advantages of the present invention will become more apparent from the following description taken in conjunction with the accompanying drawings, in which:

FIG. 1 is a block diagram of a tracking distance-measuring system in first and second embodiments according to the present invention;

DETAILED DESCRIPTION OF THE PREFERRED EMBODIMENTS

Figure 5:
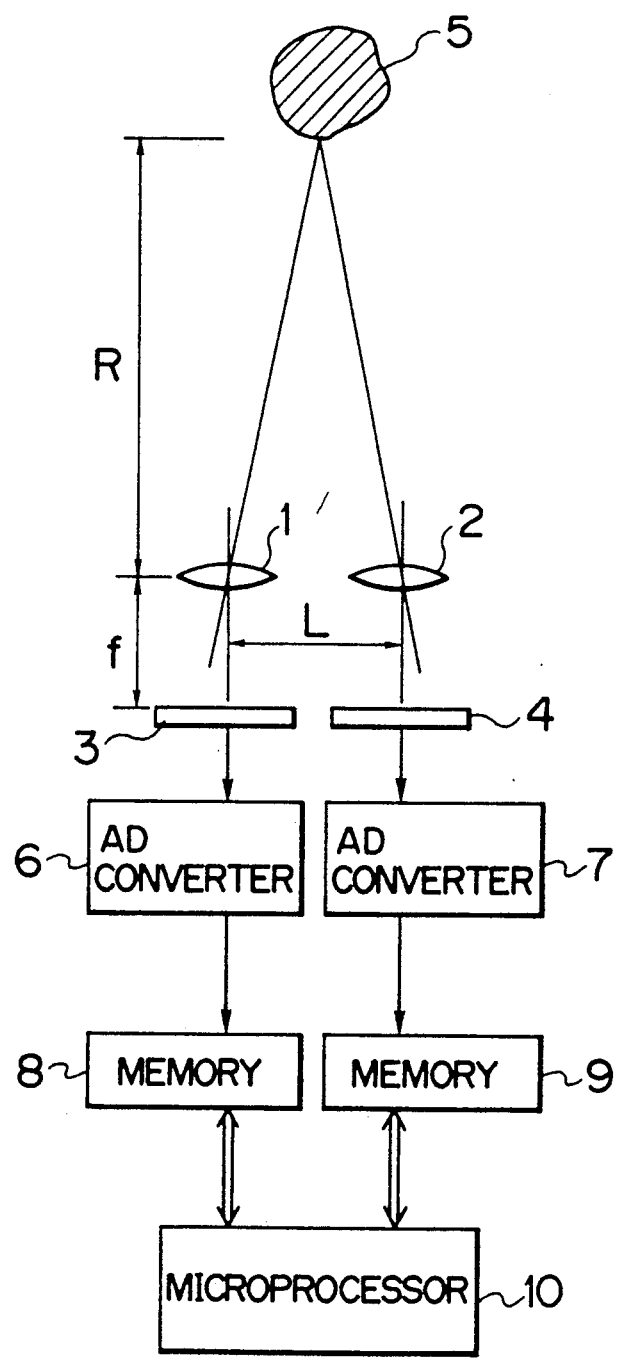
FIG. 5 is a block diagram of a conventional distance-measuring equipment.

FIG. 1 shows a tracking distance-measuring system according to a first embodiment of the present invention, in which parts like or corresponding to those of the conventional distance-measuring system described previously with reference to FIG. 5 are denoted by the same reference characters and the description thereof will be omitted to avoid duplication.

Referring to FIG. 1, a display 11 for displaying an image is controlled by the microprocessor 10. A windowing unit 12 is operated by the operator to set a window. The size and position of the window are confirmed on the display 11.

Figure 2A:
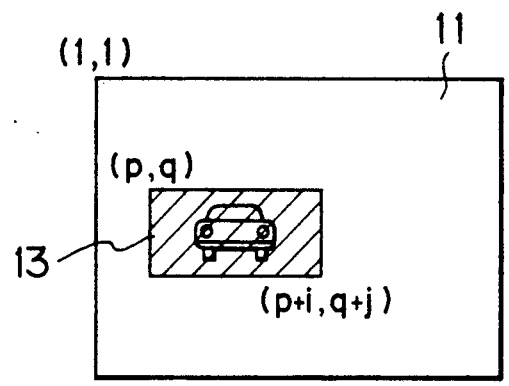
FIGS. 2A and 2B are illustrations of assistance in explaining a manner of comparing images in windows.

The operation of the tracking distance-measuring system will be described hereinafter. Suppose that an image equivalent to the output signal of the image sensor 3 provided at a sampling point t0 is displayed on the display 11 as shown in FIG. 2A. Then, the windowing unit 12 is operated to set a window 13. The microprocessor 10 finds a storage location in the memory 8 storing a reference picture element signal for distance calculation from the signal representing the window 13. The microprocessor 10 selects regions in the memories 8 and 9 to be compared, and calculates the total sum of the absolute values each of the difference between picture element signals by shifting the image signal of the image in FIG. 2B one picture element at a time relative to the reference image signal of the image in FIG. 2A. A region 14 of an image in FIG. 2B corresponding to the window 13 in FIG. 2A participates in distance calculation.

The foregoing actions will be described mathematically.

Figure 2B:
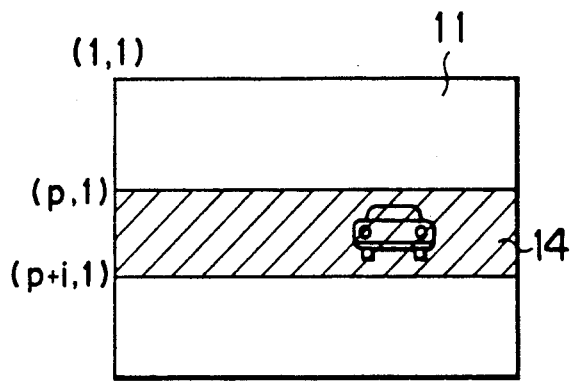

Suppose that the region of the window 13 having the X-axis and Y-axis (column and row) is a region demarcated by (p,q) and (p+i, q+j) as shown in FIG. 2A. Then, the corresponding region in the right image for comparison is in a range between (p,1) and (p+i, 1) as shown in FIG. 2B. When the respective magnitudes of the picture elements of the right and left images are $S_{xy}$ and $S'_{xy}$, then the total sum of the absolute values of the signals representing the picture element difference is expressed by an expression:

$$S_n = \sum_{k=1}^{i} \sum_{l=1}^{j} |S_{p+k,q+l} - S'_{p+k,q+n+l}|$$

Values on the Y-axis represented by k are substituted in the expression to calculate $S_n$, and in a state where the value of $S_n$ is a minimum, the right and left images coincide with each other most satisfactorily with relative dislocation of n number of picture elements.

Once the picture element shift n corresponding to the minimum value of the total sum of the picture element difference signals between the right and left images is obtained, the distance R from the target 5 can be calculated by substituting the picture element pitch p, the reference length L corresponding to the distance between the optical axes of the lenses 1 and 2 and the focal length f of the lenses 1 and 2 in the following formula:

$R = f \cdot L / n \cdot p$

Figure 3A:
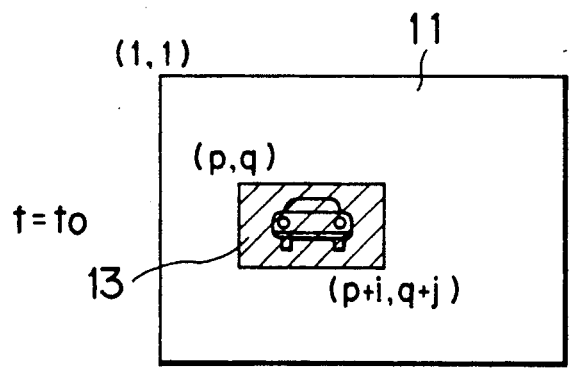
FIGS. 3A, 3B and 3C are illustrations of assistance in explaining a manner of comparing first and second images in the first embodiment by setting a new window through the comparison of an image sampled at time t0 and an image sampled at time t1 subsequent to the time t0.
Figure 3B:
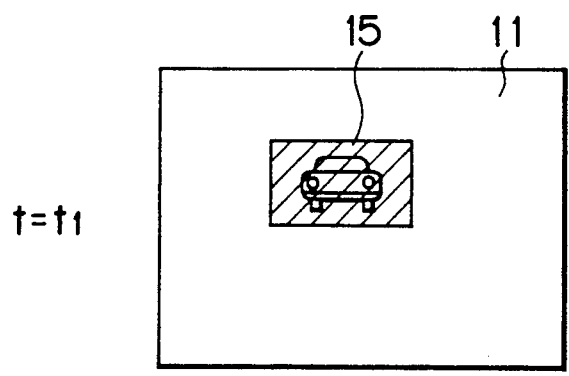
Figure 3C:
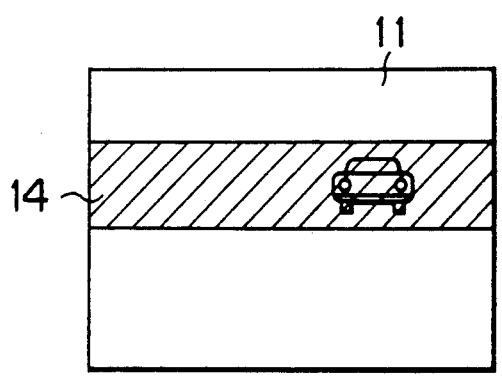

At the next sampling point t1 a short time after the sampling point t0, the image of the target 5 is focused at a position different from a position where the image of the target 5 was focused at the sampling point t0 because the target 5 is moving. In determining the position of the target 5 at the sampling point t1, in the first embodiment, the window 13 set at the sampling point t0 as shown in FIG. 3A is used as a reference image signal, the whole image sampled at the sampling point t1 is shifted sequentially one picture element at a time, and the total sum of the absolute values of the differences between the picture elements is calculated in the same way as the calculation conducted in FIGS. 2A and 2B. A region where the total sum is a minimum corresponds to the position of the target 5 at the sampling point t1. Then, the window at the sampling point t1 is set as a new window 15 at the sampling point t1 as shown in FIG. 3A. Then, the distance from the target 5 is calculated by processing the output signals of the image sensors 3 and 4 by using the new window 15. Thus, the tracking distance-measuring system is able to determine an instantaneous distance from the target 5, and the direction and distance of movement of the target 5 by tracking the moving target 5.

Further, in the second embodiment, above-mentioned calculating method is such that the region 16 set according to the moving velocity of the target 5 in an image sampled at the sampling point t1 is shifted sequentially one pixel at a time, the detailed explanation thereof being as below.

A searching range at time t1 is a range from a column p−r and a row q−t to a column p+i+r and a row q+j+t resulting from the expansion of the range at t0 by r and t determined according to the moving speed of the target 5. In this range, operation is performed by using $$S_{u,v} = \sum_{k=1}^{i} \sum_{l=1}^{j} |S_{p+k,q+l} - S'_{u+k,v+l}|$$

where p−r≦u≦p+r, q−t≦v≦q+t.

An image corresponding to a state where $S_{u,v}$ is a minimum coincides most satisfactorily with the image in the window, so that at time t1, a window is set in a range from a column u and a row v, where $S_{u,v}$ is a minimum to a column u+i and a row v+j.

Figure 4A:
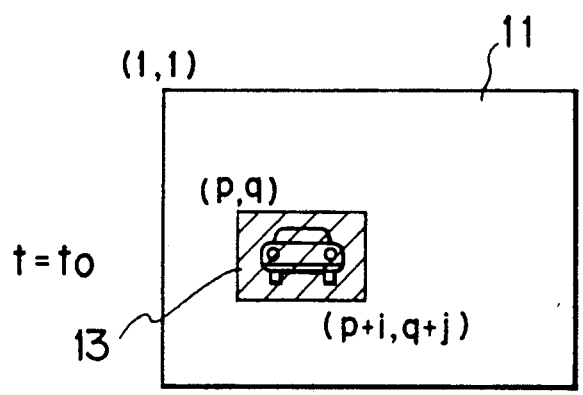
FIGS. 4A, 4B and 4C are illustrations of assistance in explaining a manner of comparing first and second images in the second embodiment by setting a new window through the comparison of an image sampled at time t0 and an image sampled at time t1 subsequent to the time t0.
Figure 4B:
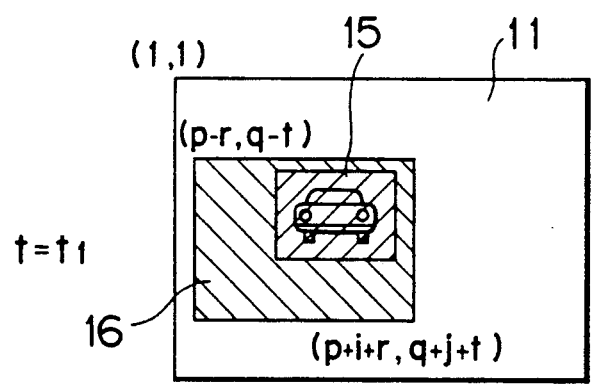
Figure 4C:
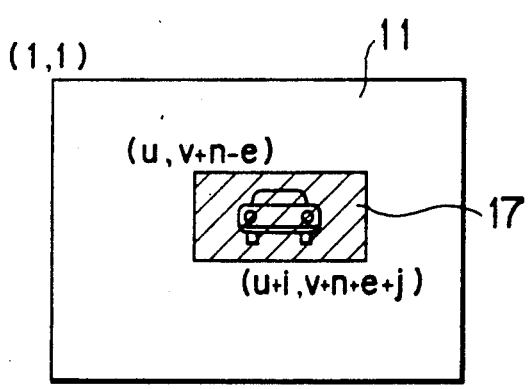

In calculating the distance at the time t1, the searching region, represented by 17 as shown in FIG. 4C, is expanded laterally by +e according to the running speed of the target 5, because the distance at t0 is known, together with the shifted number n of the picture elements corresponding to the difference. The distance is calculated by $$S_b = \sum_{k=1}^{i} \sum_{l=1}^{j} |S_{u+k,v+l} - S'_{u+k,v+b+l}|$$

where n−e≦b≦n+e.

As is shown above, in the second embodiment, since the interval between the sampling points t0 and t1 is very short and hence the distance from the target 5 varies scarcely, the region in the image signal for comparison can be limited to a region 17 as shown in FIG. 4C. Thus, processing time for determining the distance from the target 5 is curtailed and the image of the target 5 is sampled at short time intervals, the tracking distance-measuring system is able to measure the distance from the moving target 5 and to determine the direction and distance of the moving target 5 by tracking the moving target 5.

The lenses 1 and 2 may be disposed in a horizontal, vertical or oblique arrangement; the direction of extension of the base line is changed according to the arrangement of the lenses 1 and 2. A single image sensor having two separate sensing regions may be employed instead of the two image sensors 3 and 4.

As is apparent from the foregoing description, the tracking distance-measuring system according to first and second embodiments of the present invention is able to set a window in an image, samples an image signal at predetermined time intervals, and compares an image in a window set at a sampling point and an image sampled at the next sampling point to determine the direction and distance of movement of a moving target and to set a new window. This procedure is repeated periodically in both embodiments to track the moving target and to measure the distance to the moving target continuously, although it can be more effectively done in shorter time in the case of the second embodiment.

Thus, the tracking distance-measuring system is capable of measuring the distance to a moving target and determining the direction of movement of the moving target and is effectively applicable, for example, to measuring the distance to an automobile running ahead.

Although the invention has been described in its preferred form with a certain degree of particularity, obviously many changes and variations are possible therein. It is therefore to be understood that the invention may be practiced otherwise than as specifically described herein without departing from the spirit and scope thereof.

What is claimed is:

1. A tracking distance-measuring system for measuring a distance from a moving target on the principle of triangulation by electrically detecting a respective dislocation of first and second images individually focused on first and second image sensors (3,4) by first and second juxtaposed optical systems (1,2) and comparing corresponding first and second image signals provided by the image sensors, said tracking distance-measuring system comprising:

means for setting a window in a specific portion of either the first or second image signal;

means for determining the distance from the moving target by comparing the first and second image signals on the basis of an image signal in the window; and means for sampling the image signals periodically at predetermined time intervals for comparing the image signal within the window set at a sampling point and an image signal at the next sampling point to set a new window in a portion of the image signals best coinciding with each other for determining the direction and distance of movement of the target from a variation.

2. A tracking distance-measuring system for measuring a distance from a moving target on the principle of triangulation by electrically detecting a respective dislocation of first and second images individually focused on first and second image sensors (3,4) by first and second juxtaposed optical systems (1,2) and comparing corresponding first and second image signals provided by the image sensors, said tracking distance-measuring system comprising;

means for setting a window in a specific portion of either the first or second image signal;

means for determining the distance from the moving target by comparing the first and second image signals on the basis of an image signal in the window; and means for sampling the image signals periodically at predetermined time intervals, comparing the image signal within the window set at a sampling point and a specific portion of an image signal sampled at the next sampling point corresponding to the moving velocity of the target, and setting a new window in a portion of the image signal best coinciding with the previous window for determining the direction and distance of movement of the target from a variation.

3. A tracking distance-measuring system for measuring a distance from a moving target as claimed in claim 2, wherein a region for comparing a reference image signal in the window with either the first or second image signal is specified in accordance with the moving velocity of the target on the basis of the distance determined at the preceding sampling point.

* * * * *